United States Patent
US 11,767,475 B2
Schuppel
Sep. 26, 2023

(54) SYSTEM AND PROCESS FOR HEAVY FUEL OIL PYROLYSIS

(71) Applicant: PURAGLOBE HOLDING GmbH, Elsteraue OT Alttroeglitz (DE)

(72) Inventor: Andreas Schuppel, Markkleeberg (DE)

(73) Assignee: PURAGLOBE HOLDING GmbH, Elsteraue OT Alttroeglitz (DE)

(*) Notice: Subject to any disclaimer, the term of this patent is extended or adjusted under 35 U.S.C. 154(b) by 60 days.

(21) Appl. No.: 17/438,968

(22) PCT Filed: Mar. 13, 2020

(86) PCT No.: PCT/EP2020/056888
§ 371 (c)(1),
(2) Date: Sep. 14, 2021

(87) PCT Pub. No.: WO2020/187754
PCT Pub. Date: Sep. 24, 2020

(65) Prior Publication Data
US 2022/0145191 A1    May 12, 2022

(30) Foreign Application Priority Data
Mar. 15, 2019  (EP) .................................. 19163105

(51) Int. Cl.
*C10G 9/04*   (2006.01)
*C10B 7/02*   (2006.01)
(Continued)

(52) U.S. Cl.
CPC .................. *C10G 9/04* (2013.01); *C10B 7/02* (2013.01); *C10B 43/04* (2013.01); *C10B 55/00* (2013.01);
(Continued)

(58) Field of Classification Search
CPC .......... C10G 9/002; C10G 9/005; C10G 9/04; C10B 1/10; C10B 7/02; C10B 43/04
See application file for complete search history.

(56) References Cited

U.S. PATENT DOCUMENTS

| 3,298,679 A | 1/1967 | Krautheim et al. |
| 2001/0002308 A1 | 5/2001 | Schleiffer et al. |
| 2015/0368564 A1* | 12/2015 | Wheeler .................. C10G 1/02 202/83 |

FOREIGN PATENT DOCUMENTS

| CA | 2926434 A1 | 10/2017 |
| CA | 2973210 A1 | 1/2019 |

(Continued)

*Primary Examiner* — Renee Robinson
(74) *Attorney, Agent, or Firm* — THE WEBB LAW FIRM

(57) ABSTRACT

Provided is a system for continuous processing of heavy fuel oil from recycling waste oil and the processing residues of crude oil into useful products including means for feeding waste oil; at least one hot-gas filter, at least one condenser, at least one rotating kiln including an outer stationary jacket which forms a heating channel, and an inner rotating reactor, and means for removing solid coke from the rotating reactor. The at least one hot gas filter is configured to separate a naphtha/gasoil fraction after the processing of the heavy fuel oil from a soft coke fraction. The rotating reactor is configured to recover a solid coke fraction comprising high contaminant content. The invention further relates to a process for continuous processing of heavy fuel oil from recycling waste oil and the processing residues of crude oil into useful products, preferably with the system of the invention. Moreover, the invention relates to use of the products and waste products produced with the process and system of the invention.

15 Claims, 6 Drawing Sheets

(51) Int. Cl.
*C10B 43/04* (2006.01)
*C10B 55/00* (2006.01)

(52) U.S. Cl.
CPC ............... *C10G 2300/1007* (2013.01); *C10G 2300/107* (2013.01); *C10G 2300/708* (2013.01); *C10G 2400/06* (2013.01)

(56) References Cited

FOREIGN PATENT DOCUMENTS

| | | | | |
|---|---|---|---|---|
| CN | 203159539 U | 8/2013 | | |
| CN | 205188210 U | 4/2016 | | |
| CN | 107502381 A | 12/2017 | | |
| DE | 29704044 U1 | 7/1998 | | |
| DE | 69732164 T2 | 12/2005 | | |
| EP | 0832962 A2 | 4/1998 | | |
| EP | 1067171 | * 10/2001 | ............... | C10B 1/10 |
| JP | S5971389 A | 4/1984 | | |
| WO | WO 2008/110834 | * 9/2008 | ............ | C10B 47/34 |
| WO | 2011143770 A1 | 11/2011 | | |

* cited by examiner

SYSTEM AND PROCESS FOR HEAVY FUEL OIL PYROLYSIS

CROSS-REFERENCE TO RELATED APPLICATIONS

This application is the United States national phase of International Application No. PCT/EP2020/056888 filed Mar. 13, 2020, and claims priority to European Patent Application No. 19163105.0 filed Mar. 15, 2019, the disclosures of which are hereby incorporated by reference in their entirety.

BACKGROUND OF THE INVENTION

Field of the Invention

The invention provides a system for continuous processing of heavy fuel oil from recycling waste oil and the processing residues of crude oil into useful products comprising means for feeding waste oil; at least one hot-gas filter, at least one condenser, at least one rotating kiln comprising an outer stationary jacket which forms a heating channel, and an inner rotating reactor, and means for removing solid coke from the rotating reactor; wherein the at least one hot gas filter is configured to separate a naphtha/gasoil fraction after the processing of the heavy fuel oil from a soft coke fraction; and wherein the rotating reactor is configured to recover a solid coke fraction comprising high contaminant content. The invention further relates to a process for continuous processing of heavy fuel oil from recycling waste oil and the processing of residues from crude oil into useful products, preferably with the system of the invention. Moreover, the invention relates to use of the products and waste products produced with the process and system of the invention.

Description of Related Art

The heavy oil (residual oil) produced during oil distillation accounts for about 70 percent of the fuel used in shipping worldwide. From 2020 onwards, ships on the high seas will only be allowed to burn fuel with a Sulphur content of 0.5 percent or below instead of 3.5 percent allowed so far, or will alternatively have to remove the Sulphur from the exhaust gases. As a result of the new regulation, which will be set in force in 2020, environmentally harmful heavy fuel oil cannot be used as a fuel anymore and a large number of international shipping companies will have to replace heavy fuel by more environmentally friendly ship diesel. This in turn has a direct influence on the refineries. There will no longer be a market for their residual heavy oil products in the future.

For this reason, methods for re-processing the residual oils produced are needed, preferably aiming to the recycling of the heavy oils, e.g. by reintegration into production processes of oils.

Heavy fuel oil essentially consists of long-chain saturated hydrocarbon compounds (heavy boilers). In order to generate a usable product, processes are needed to degrade these long chain hydrocarbons into shorter chains. One suitable method is pyrolysis, i.e. the so-called "cracking process". The pyrolysis is forced by high temperatures under exclusion of oxygen. Gases, liquids and solids are produced as pyrolysis products.

Conventionally, pyrolysis is performed in systems comprising a rotating kiln as reactor, in which the cracking of the long chain hydrocarbons of the heavy oil takes place. In the rotating kiln, the heavy oil must be finely atomized and evenly distributed on the inner wall of the rotating kiln. The necessary reaction temperature is usually produced by external heating the rotating kiln and the cracking reaction takes place at the inner wall of the kiln. As a safeguard, the rotating kiln can be filled with a protective medium such as nitrogen. When the cracking reaction takes place, the long chain hydrocarbons are converted into gaseous products and coke is produced as a major byproduct. The coke occurs as a soft coke, which is distributed in the gaseous phase and which has to be eliminated from the gaseous products before their condensation. Coke further occurs as solid coke adhering to the inner wall of the rotating kiln. A growing coke layer at the inner wall of the rotating kiln is disadvantageous, because it forms a heat insulating layer, which disturbs the cracking reaction. As a result, the heavy fuel oil cannot reach the reactor wall and the temperature for initiating the cracking reaction cannot be reached effectively.

Therefore, several attempts have been made to overcome these disadvantages, and in particular to remove the solid coke occurring at the reactor wall during the cracking reaction.

CA 2926434 concerns a rotary kiln for the treatment of waste oil and other organic waste. The rotary kiln here is equipped with loosely mounted plates which shall prevent the deposition of coke in the bottom area of the rotary kiln, or shall lead to the scraping off deposited coke. However, during the operation, the loosely mounted plates are distributed randomly within the rotary kiln and after short time of operation, the bottom of the rotary kiln is blocked by a mixture of plates and coke debris. The material flow in the reactor is hindered and the coke cannot be discharged quickly enough, which further increases the size of the bed. This means that the required temperatures cannot be maintained and the heavy fuel oil is sprayed onto the material on the bottom of the reactor and the cracking reaction is thereby disturbed. Therefore, a continuous operation of the rotary kiln as described in CA 2926434 is not possible.

The German utility model DE 29704044 U1 deals with the problem of the formation of solid layers on the inner wall of rotary kilns resulting from the smoldering of materials containing hydrocarbons, such as residues from heavy oil and coal hydrogenation. To solve this problem, rolling elements are used to clean the inner wall of the drum. These rolling elements, however, are themselves covered with the solid material during operation of the rotary kiln, wherein their effectivity in cleaning the inner wall of rotary kilns is decreased and the maintenance efforts of the entire system is increased.

DE 69732164 T2 concerns processes for removing impurities from oil. In particular, the invention relates to a device for removing contaminants from used oil, in which device the oil is subjected to evaporation and pyrolysis to form coke. Contaminants such as heavy metals remain in the coke, which can then be separated from the oil. The device comprises a rotating kiln, which is indirectly heated. Also in this device, the problem has to be solved that coke deposited on the reactor walls has to be removed. To solve this problem, the reaction chamber is equipped with granular, crude solids (such as metal chips), which act to chafe and crush coke from the reactor wall. Such system, however, can only be operated discontinuously, because the granular, crude solids are mixed with the coke crushed from the reactor wall during operation. This mixture accumulates in the reactor and needs to be removed regularly from the reactor.

Taken together the problem that coke deposits form on the reactor wall and have to be removed from it during thermal decomposition of heavy fuel oils in rotary reactors is known in the art. To solve this problem, devices for mechanical removal of the coke as described above have been developed. However, all these solutions are associated with disadvantages such as no reliable operation, high maintenance efforts as well as the need for discontinuous removal of materials from the reactor and disposal as waste. Therefore, the solutions known in the art do not offer the possibility of processing heavy fuel oil in a reliable continuous process.

SUMMARY OF THE INVENTION

Accordingly, it was the purpose of the invention to overcome the problems of the prior art and to provide a simple and reliable system and process for the continuous pyrolysis of heavy fuel oil.

To solve this problem, the invention provides a system for continuous processing of heavy fuel from the recycling of waste oil and the processing of residues from crude oil into useful products comprising
means for feeding waste oil;
at least one hot-gas filter,
at least one condenser,
at least one rotating kiln comprising an outer stationary jacket (120) which forms a heating channel (121), and an inner rotating reactor (110), and
means for removing solid coke from the rotating reactor (110);
wherein the at least one hot gas filter is configured to separate a naphtha/gasoil fraction after the processing of the heavy fuel oil from a soft coke fraction; and
wherein the rotating reactor (110) is configured to recover a solid coke fraction comprising high contaminant content;
characterized in that
said system (100) comprises a number of gas burners (130) arranged along the longitudinal direction and sufficient to evenly and indirectly heat the rotating reactor (110);
the rotating reactor (110) comprises scraper means (111), wherein said scraper means (111) are arranged inclined and are configured to continuously remove accumulated solid coke from the inner wall (114) of the rotating reactor (110) and converting said accumulated solid coke into powdery coke;
said means for feeding heavy fuel oil comprises a number of spray lances (150) of different length and configured to distribute with nozzles (151) said waste oil evenly along the longitudinal direction within the rotating reactor (110); and
said system (100) is configured to operate at a process temperature in the range of 500 to 600° C., preferably at about 550° C., measured at the inner wall of the rotating reactor (110).

The continuous cleaning of the inner wall of the rotating reactor is one of the crucial points in the construction of the system according to the invention, since the heat transfer is hindered by the layer structure of the coke and thus the cracking process of the heavy fuel oil on the reactor wall and within the volume of the rotating reactor is disturbed.

To solve this problem, the rotating reactor according to the invention is equipped with scraper means that are aligned with the reactor wall. The distance between the scraper means and the reactor wall should be kept as small as possible in order to reduce the thickness of the layer structure of the coke and thus the deteriorating heat transfer. In a preferred embodiment of the invention, the distance between the scraper means and the reactor wall is in the range of 0.5 to 2.0 mm, preferably 0.6 to 1.5 mm, more preferably 0.7 to 1.0 mm. Most preferably, the distance between the scraper means and the reactor wall is 0.8 mm.

Scraper means according to the invention are preferably scraper plates made from a suitable material such as iron or steel or stainless steel. In a further embodiment, the scraper means are mounted on distance elements which are fixed on a central lance in the rotating reactor. Further preferably, the scrapers are firmly fixed, i.e. b welding, during assembly of the lance in the rotating reactor. This ensures the alignment of each scraper individually and thus maintains the desired small distance between scraper and reactor wall, considering manufacturing tolerances of the reactor vessel. The lance is preferably secured against twisting and must have a possibility to expand in length due to temperature influences. The number and dimensions of the scraper plates are configured in accordance with the dimensions of the rotating reactor. Preferably, the system of the invention comprises between 2 and 10 scraper plates, more preferably 3 to 8 scraper plates, most preferably 4 or 5 scraper plates, which extend over the entire length of the cylindrical part of the rotating reactor.

In a further preferred embodiment, the scrapers are arranged such that a faster transport of the scraped coke out of the reactor is supported. This is in a preferred embodiment of the invention realized by inclining the position of the scrapers relative to the reactor wall. The scraper plates are preferably inclined relative to the reactor wall in angle between 4 and 10°, more preferably between 5 and 9°, most preferably between 6 and 8°.

In a further embodiment, the rotating reactor is equipped at the lower end of the inclined reactor with a funnel, wherein said funnel comprises auger plates to discharge the material from the rotating reactor. The funnel and the auger plates are preferably made of a suitable material, such as iron or steel or stainless steel.

The advantage of this construction, in particular the combination of inclined scraper plates with the funnel comprising auger plates is that the scraped coke is discharged from the rotating reactor continuously in an easy way and without the need of further constructional means, simply by gravity. The discharge of the scraped coke by gravity is further supported by the arrangement of the rotating reactor, which is inclined in direction of the lower end, i.e. towards the funnel comprising auger plates. Preferably, the rotating reactor is inclined at an angle between 2 and 8°, preferably 3 to 6°, most preferably 4 to 5°.

In a further embodiment, the system of the invention comprises downstream components such as a diverter, double pendulum dampers and screws for discharging the scraped coke. Preferred downstream elements comprise a diverter, rotary valves, a hot-rolling screw conveyor and a cooling screw conveyor. The solids are conveyed from the rotating reactor into the diverter. In the subsequent downstream elements, the coke must be cooled from the process temperature down to a temperature of e.g. 60° C. in the cooling screw. After passing the cooling screw, the scraped coke may be filled in big bags or other types of containers for storage and further handling. Accordingly, the system of the invention comprises in a further embodiment downstream means for filling the scraped coke into containers, such as Big Bags.

In order to promote the cracking reaction, the rotating reactor must be heated to reach and maintain the process temperature, which is suitably in the range of 400 to 700° C., preferably between 450 and 600° C., more preferably between 500 and 550° C. In a preferred embodiment, the rotating reactor is heated indirectly. This has the advantage that the occurrence of hotspots or punctual heat in the reactor wall is prevented, which could occur with direct heating. Indirect heating is realized preferably by an outer jacket, which forms a housing and heating channel around the rotating reactor. Burners, such as gas burners, are used to heat the air in the heating channel (the space between the rotating reactor and the outer jacket) of the system of the invention. A further challenge is to apply the required heat evenly over the whole body of the rotating reactor. This problem is solved in the preferred embodiment of the invention in that and number of burners, such as gas burners are arranged to apply indirect heat along the entire length of the rotating reactor. In a further preferred embodiment, 2 to 6 gas burners are used for indirect heating, more preferably 3 to 5 gas burners most preferably 4 gas burners. The number of gas burners, however, may be adopted in accordance with the dimensions of the rotating reactor. Moreover, the gas burners must have an output sufficient to support the cracking reaction in the rotating reactor. The total output of the gas burners is preferably between 500 and 2,000 kW, more preferably between 750 and 1,500 kW, most preferably between 950 and 1.250 kW. In a further preferred embodiment of the invention, the burners are mounted to the heating tunnel via a pre-combustion chamber. In order to prevent heat loss, the pre-combustion chamber and the heating tunnel are insulated.

To ensure that the heating gas is evenly distributed in the heating tunnel, means are provided on the outer wall of the rotating reactor. Such means are preferably plates, such as ribbed plates, which are made from a suitable material, such as iron, steel or stainless steel. These means are to ensure that a turbulent flow of the heating gas can be ensured. The system of the invention therefore comprises in a further embodiment ribbed plates for supporting the distribution of the heated air, wherein said ribbed plates are mounted on the outer wall of the rotating reactor. The number and the dimensions of these ribbed plates are configured in accordance with the dimensions of the system of the invention, i.e. of the rotating reactor.

The system of the invention may further comprise maintenance holes in the jacket, the rotating reactor as well as in the exhaust of the heating gas.

A further challenge, which has been solved by the system of the invention, is the even distribution of the heavy fuel oil over the entire length of the rotating reactor. For this reason, the heavy fuel oil is not distributed into the rotating reactor with one spray lance only. The number of spray lances has been rather increased in accordance with the length of the rotating reactor, especially in accordance with the length of the cylindric part of it. Accordingly, the system of the invention comprises more than one, e.g. 2 to 8, preferably 3 to 6, most preferably 4 to 5 spray lances, which guarantee even distribution of the sprayed heavy fuel oil with in the rotating reactor. The spray lances have different lengths in order to distribute the heavy fuel oil with defined parts or areas of the rotating reactor, whereby it is advantageous that the length of the spray lances is selected in order to prevent overlapping spray pattern.

In this regard, the design of the nozzles, which are mounted at the end of the spray lances in the rotating reactor, has also been optimized. The nozzle used are as fine as possible and do not have a too large spray cone. This construction has the advantage that an overlapping spray pattern is prevented. The use of a flat spray nozzles is not recommended, as these are only to be used for coarse spray patterns. In a preferred embodiment of the invention, the nozzles used at the end of the spray lances have a spray cone with a spray angle at the outlet of the nozzle of approx. 45°. This construction ensures that not too much material is sprayed onto a too small area, because this would deteriorate the heat transfer within the rotating reactor and therefore disturb the cracking reaction.

Solids, such as coke, are continuously scraped from the rotating reactor wall during its operation, forming a bed of debris in the certain area on the bottom of the rotating reactor. This bed of debris detoriates the heat transfer on the reactor wall and into the rotating reactor at least locally. Spraying the heavy fuel oil on the bed of the breeze would lead to an incomplete cracking reaction. In a further embodiment of the invention, the direct action of the nozzles is therefore arranged to spray the heavy fuel oil on areas of the wall of the rotating reactor, which is free of debris of solids and coke.

The remaining solids, such as soft coke and dust, in the gas stream need also to be separated downstream. The quality of the purified gas is decisive for the stability of the further process. The system of the invention therefore comprises in a further embodiment means for removal of the remaining solids from the gas stream. Suitable means for the removal of the remaining solids from the gas stream are for example cyclones or hot gas filtration systems. Most preferred in accordance with the invention are hot gas filtration systems. A suitable hot gas filtration system comprises e.g. fibre-ceramic filter cartridges. Such a hot gas filter may comprise rigid filter elements, which are suspended in an insulated container with a conical dust collection chamber, wherein the filter cartridges made of robust ceramic fibers are resistant to temperatures up to 850° C. and chemicals. Suitable fiber ceramic materials for this purpose are available in the art. In a further preferred embodiment, the hot gas filter is equipped with means for cleaning the filter cartridges. Such means are e.g. selected from jet valves, which are opened in short intervals (fractions of a second), whereby the filter cartridges are purged with an inert purge gas, such as nitrogen gas at high pressure.

In a further embodiment, the system of the invention comprises seals between the rotating reactor and the inlet and outlet housings, and a seal between the heating channel and the reactor. In particular, the seals between the rotating reactor and the inlet and outlet housings are important for operating the process of the invention and a reliable manner.

Due to different thermal expansions, manufacturing tolerances and assembly inaccuracies, such deviations in the running accuracy of sealing surfaces are not completely unavoidable. Such constructional tolerances are crucial for functioning seals. The concentricity of the rigid part of the system plays an important role in this regard. If concentricity is very small, the sealing surface contacts evenly against the rotating part of the system and thus fulfils its function. However, if there is a too large deviation, the seal can no longer bridge the distances between the components. Unfortunately, conventional seals have been proven unreliable and expensive from operating experience.

The seal between the outer jacket and the rotating reactor serves primarily to reduce heat losses and therefore does not make any demands on the gas and dust tightness. In a preferred embodiment of the invention, graphite segments are used and are distributed over the circumference and mounted on the heating channel and pressed to the wall of the rotating reactor with the aid of springs and a forced guide. This provides a simple, reliable solution for sealing the rotating reactor.

The system of the invention is in further embodiment equipped with heat exchanger. This has the advantage that the pyrolysis and flue gases can be used for heat recovery, i.e. the thermal energy of the flue gases is used to preheat the combustion air required for the gas burners in order to ultimately save natural energy, i.e. natural gas, and also to reduce the output size of the burners as far as possible. Surprisingly, if the pyrolysis gas is fed via a heat exchanger for residual heat utilization, heat energy can be obtained between 120 and 170 MJ/h at efficiencies between 0.5 and 0.7 with the system of the invention. Accordingly, the system of the invention can be operated in an environmental-friendly manner.

In a further embodiment, the system of the invention comprises a condenser for separating the heavy boiling hydrocarbons, aqueous phase and inert gas fraction from the dust-free pyrolysis gas. The condenser is suitably arranged in the system after the hot gas filter.

To ensure the inert environment within the system during continuous operation, the system is operated under slight overpressure in an oxygen free atmosphere.

In order to facilitate the cracking process in the rotating reactor and to ensure a reliable operation in a continuous manner, the system of the invention is configured to prevent any cold bridges and to keep the temperature of and in the rotating reactor including parts that are connected to the rotating reactor, in the range of the process temperature as described above.

In a further aspect, the invention provides a process for continuous processing of heavy fuel oil from the recycling of waste oil and the processing of crude oil, into useful products comprising the steps of
thermal cracking of heavy fuel oil in system according to the invention;
discharging the process gas from the rotating reactor via the hot-gas filter for separation of soft coke particles and thereafter via the condenser;
discharging the powdery coke from the rotating reactor;
partial condensation of the process gas in a condenser and drain off the resulting naphtha/gas oil mixture into storage tanks for further processing.

The process of the invention can be described in a general manner as follows: The thermal cracking (pyrolysis) takes place in the rotating reactor of the invention. Feed pumps convey the starting product (heavy fuel oil) from the storage tank to the subsequent subsystems. The feed is heated by electric flow heaters. The preheated oil is mixed with steam on the input side, preferably under ratio control, and injected into the rotating reactor. The pyrolysis takes place in a temperature range between 400 to 700° C., preferably between 450 and 600° C., more preferably between 500 and 550° C., measured at the inner wall of the rotating reactor. The long-chain hydrocarbon compounds are degraded and pyrolysis coke and pyrolysis gas are produced. The coke adheres to a great extent to the reactor wall and forms solid coke, which disturbs thermal flow from the heating channel of the system of the invention into the rotating reactor. The solid coke is therefore removed by scraper means and discharging means and conveyed out of the rotating reactor by gravity.

The pyrolysis gas produced contains a not inconsiderable proportion of solids. These are to be removed directly from the hot gas stream, preferably by means of a hot gas filter, which in a more preferred embodiment of the invention comprises fiber-ceramic filter cartridges. The quality of the purified gas is decisive for the stability of the further process.

The solids-free pyrolysis gas is a mixture of heavy boiling hydrocarbons, low boiling hydrocarbons and water in the presence of inert gas components which are separated by condensation. The resulting hydrocarbon liquids from heavy boiling hydrocarbons and water are discharged from the system of the invention via defined service lines in a storage tank for further use. The remaining non-condensed gases (low boilers) serve as fuel for the gas heaters of the system of the invention.

The separated solids are fed to a Big Bag filling system via a hot-rolling screw conveyor and a cooling screw conveyor. The Big Bags are e.g. temporarily stored in a small warehouse before they are shipped for recycling by truck. Recycling of the separated solids may e.g. be done by use as fuel for blast furnaces.

The specific features of the process of the invention are described in connection with FIG. 10 below.

In a further aspect, the invention relates to the use of the gas oil/naphta produced with the system and/or the process of the invention for manufacturing useful products, such as fuel, base oil and base oils products.

Moreover, the invention relates to the use of the powdery coke produced with the system and/or the process of the invention as fuel in blast furnaces.

The advantage of this aspect of the invention is that almost any products as well as waste products resulting from the process of the invention are re-usable or recyclable.

BRIEF DESCRIPTION OF THE DRAWINGS

The invention is further illustrated in more detail by eight figures, wherein.

DESCRIPTION OF THE INVENTION

Figure 1:
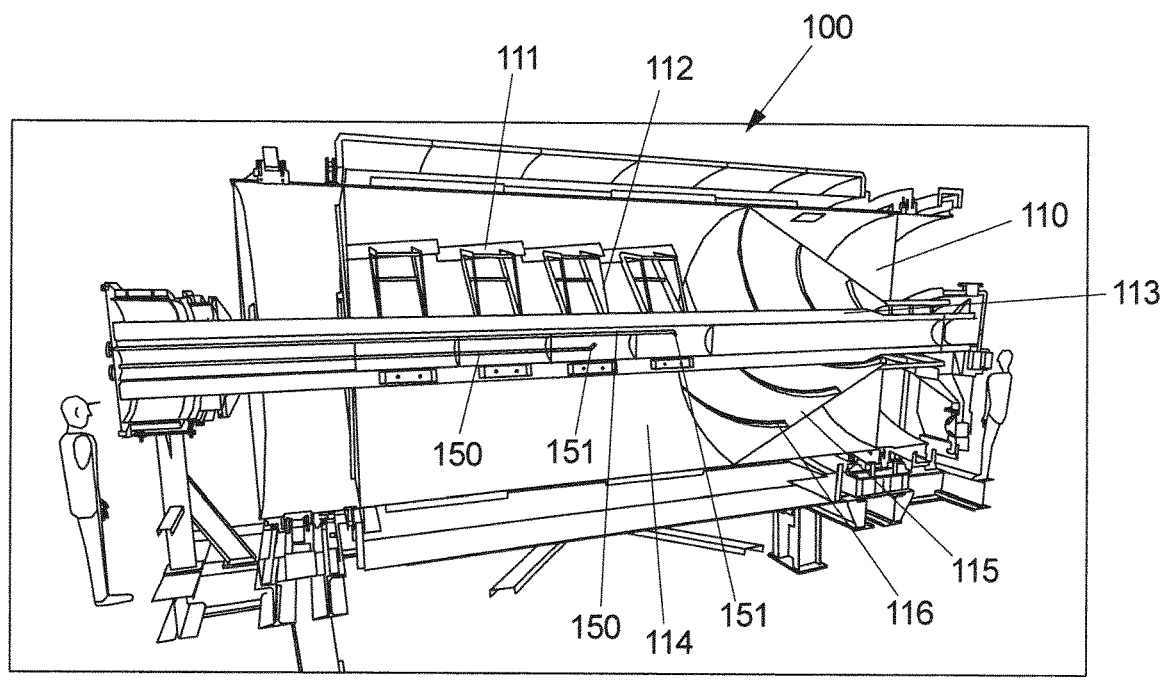
FIG. 1 shows a cross-sectional view of the system of the invention.

FIG. 1 shows a cross-sectional view of the system 100 of the invention. The system 100 comprises a rotating reactor 110, which is equipped with four scraper plates 111 in the cylindrical part 114 of the rotating reactor. The distance between the scraper means 111 and the reactor wall 114 is kept at distance of about 0.8 mm. It is important that this distance is kept as small as possible in order to reduce the layer structure of the coke and thus to reduce the deterioration of the transfer into the reactor 110. The scraper means 111 are mounted on distance elements 112 which are mounted on a central lance 113 in the rotating reactor 110. To ensure the required small distance to the inner wall 114 of the rotating reactor 110, the scraper plates 111 are firmly fixed, i.e. b welding, during assembly of the central lance 113 in the rotating reactor 110. Moreover, the scraper plates 111 are inclined relative to the reactor wall 114 to support the transport of the solids scraped from the wall 114 of the reactor 110 in direction of the funnel 115 by rotation of the reactor 110 and gravity. The rotating reactor 110 is inclined at an angle of 4°, which further supports the transport of the scraped solids by gravity into the direction of the funnel 115. The funnel 115 is located at the lower end of the inclined reactor 110 and comprises auger plates 116. The funnel 115 with the auger plates 116 supports the transport of the scraped solids out of the reactor 110 into a diverter (not shown), from which the solids are removed from the system 100.

Figure 2:
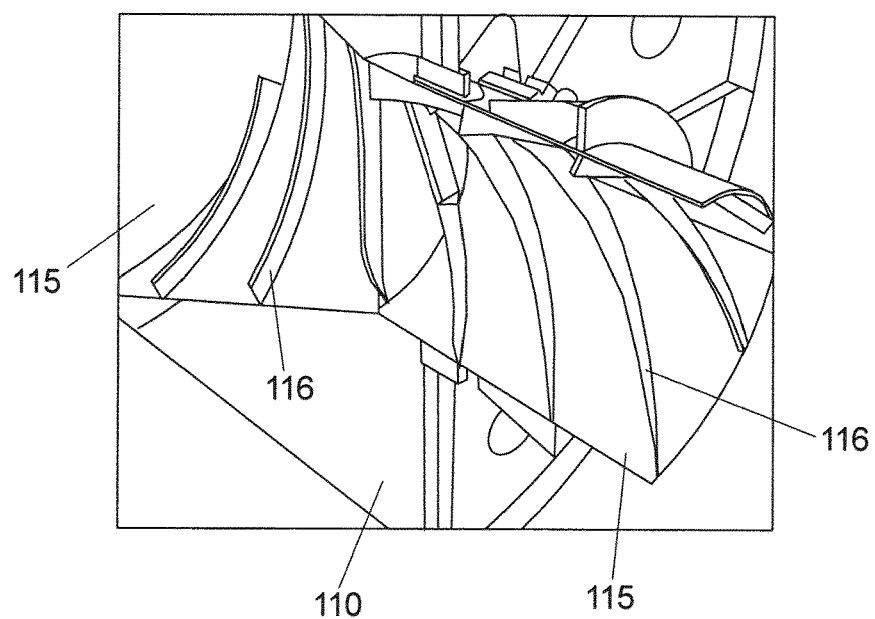
FIG. 2 shows cross-sectional view of the funnel of the rotating reactor.

FIG. 2 shows cross-sectional view of the funnel 115 of the rotating reactor 110, which is equipped with auger plates 116 supports the transport of the scraped solids out of the reactor 110 into a diverter (not shown). For introducing the heavy fuel oil into the reactor, the reactor comprises in the central lance 113 spray lances 150 with nozzles 151.

Figure 3:
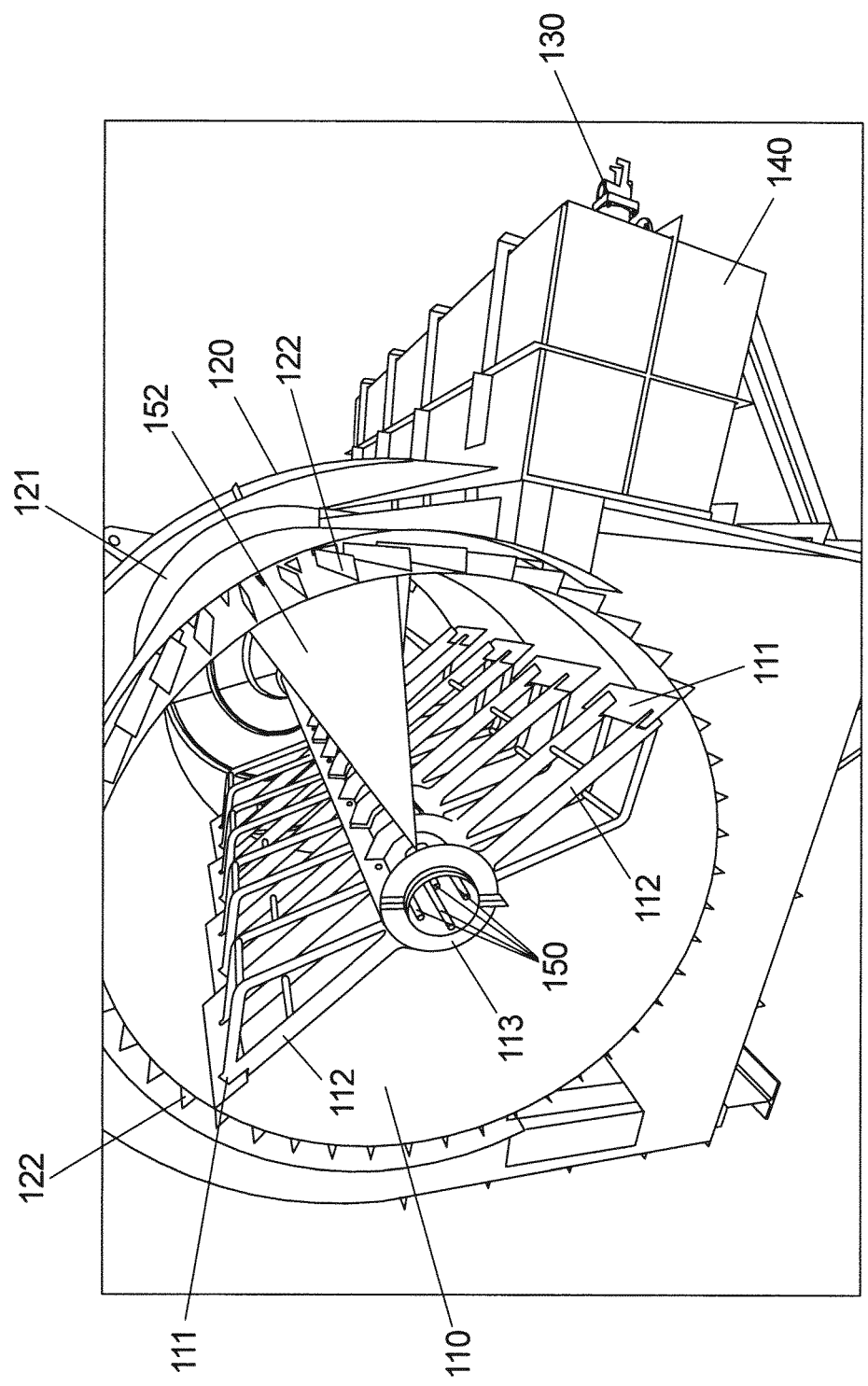
FIG. 3 shows a side-view on and into the system of the invention.
Figure 4:
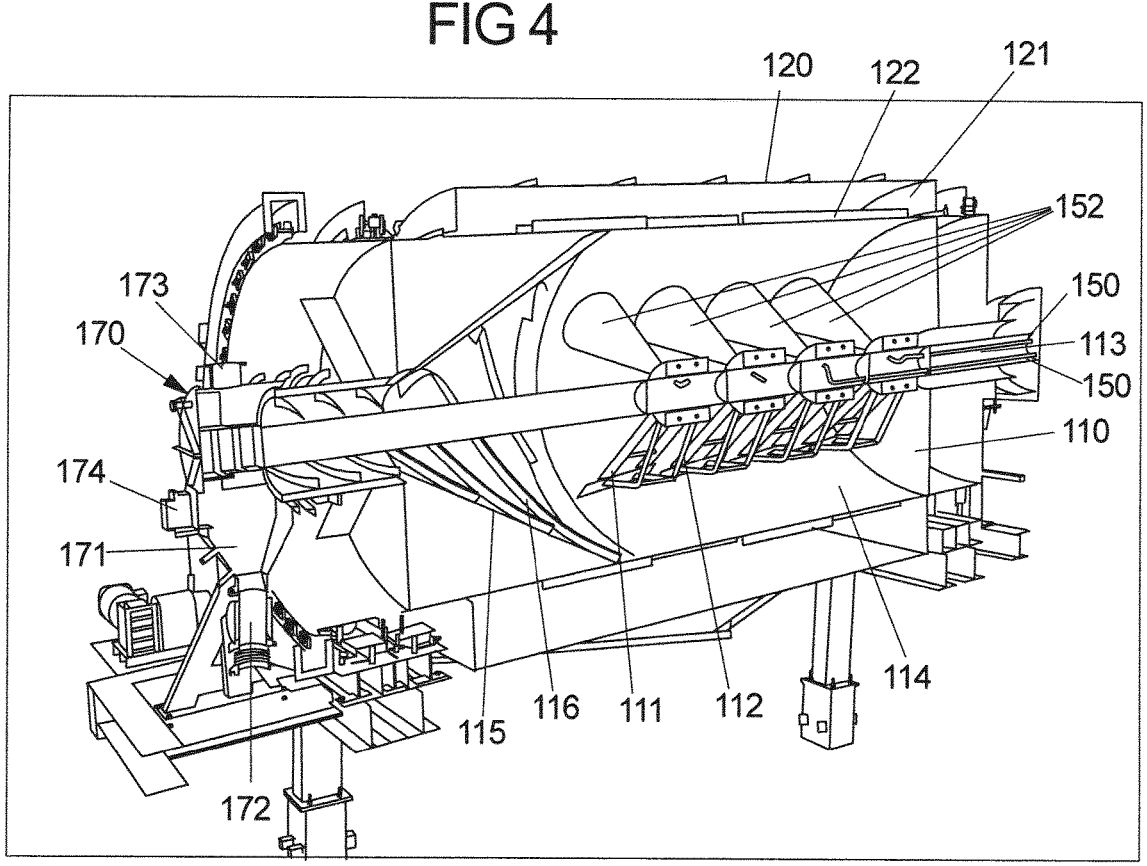
FIG. 4 shows another side-view on and into the system of the invention.

FIGS. 3 and 4 show a side-view on and into the system 100 of the invention. The system 100 comprises an outer jacket 120 which forms a housing of the system 100. Between the housing 120 and rotating reactor 110, a heating channel 121 is formed. Four gas burners 130 are mounted in a pre-combustion chamber 140 and are connected to the heating channel 121 via connecting pipes. With this construction, an indirect heating of the reactor 110 is achieved, thereby preventing the formation of punctual heat or hot spots, which may occur upon direct heating. To ensure an even heat distribution within the heating channel 121, the rotating reactor 110 is equipped with ribbed plates 122, which are fixed on the outer wall of the reactor 110. Four scraper plates 111 are mounted on distance holders 112, which are fixed on central lance 113. The system 100 comprises four spray lances 150 with nozzles 151. In FIGS. 3 and 4, the spray cones 152 of the nozzles 151 are indicated. It can be seen from FIGS. 3 and 4 that the spray cones 152 show non-overlapping pattern in order to support an even distribution of the heavy fuel oil sprayed into the reactor 110 and to prevent local overdosing of heavy fuel oil in the reactor 110.

Figure 5:
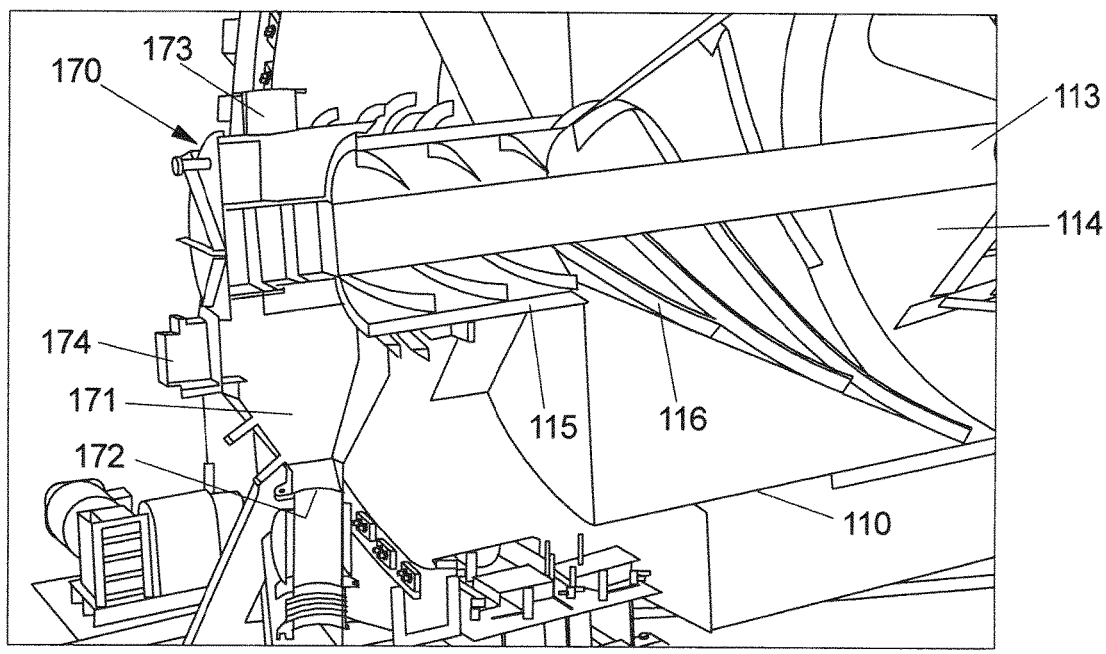
FIG. 5 shows a cross-sectional view on the diverter of the system of the invention.

In FIG. 4, it is shown that the funnel 115 of the rotating reactor 110 protrudes into the diverter 170. FIG. 5 shows a cross-sectional view of the diverter 170. The diverter 170 comprises at the lower end a funnel 171 with an outlet 172 for the solids, which fall into a rotary valve (not shown) by gravity and are discharged thereby from the system 100. On the upper end, the diverter 170 comprises an outlet for the pyrolysis gas, which is connected to the hot gas filter (not shown). The diverter 170 further comprises a maintenance opening 174.

Figure 6:
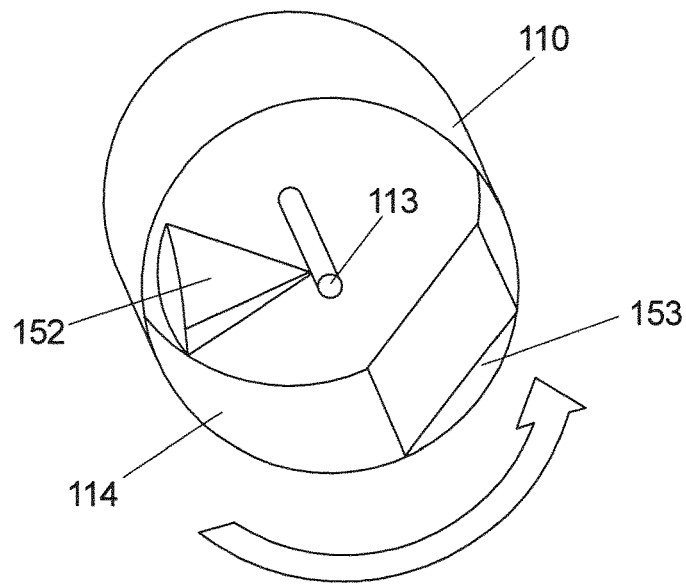
FIG. 6 illustrates the principle, how the direction of rotation and the spraying is coordinated.

FIG. 6 illustrates the principle, how the direction of rotation (indicated by the arrow) and the spraying is coordinated in the reactor 110. During operation of the system 100, a debris of scraped solids 153 is formed, which accumulates at a certain position in the reactor 110 due to the rotation of the reactor 110. The nozzles 152 are oriented such that spraying of the heavy fuel oil into the direction of the accumulated debris 153 is prevented, i.e. the heavy fuel oil is sprayed on areas of the inner wall 114 of the reactor 110, which are free from debris 153 of solids. This construction ensures that the heavy fuel oil sprayed into the reactor 110 contacts the inner wall 114 of the reactor 110 directly, wherein the reactor wall 114 has the required reaction temperature of 500 to 600° C.

Figure 7:
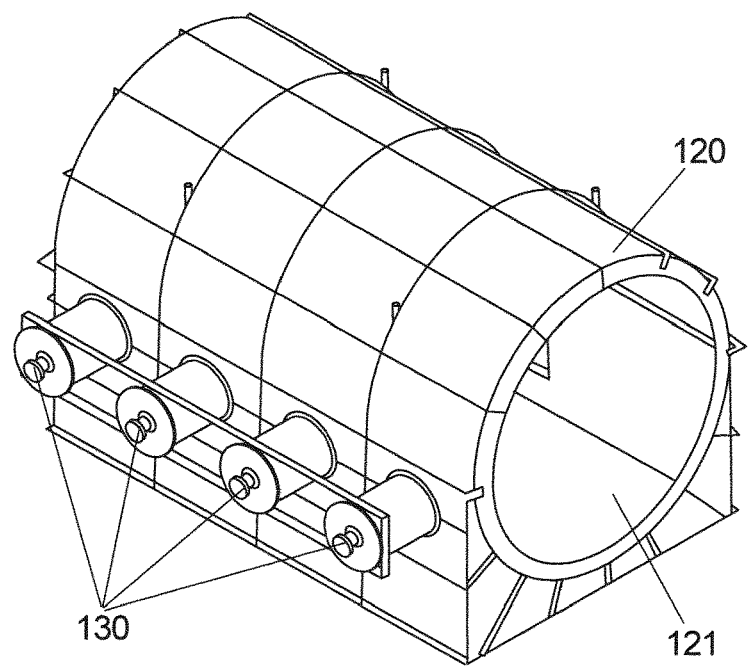
FIG. 7 shows the heating tunnel with burners and pre-combustion chamber.
Figure 8:
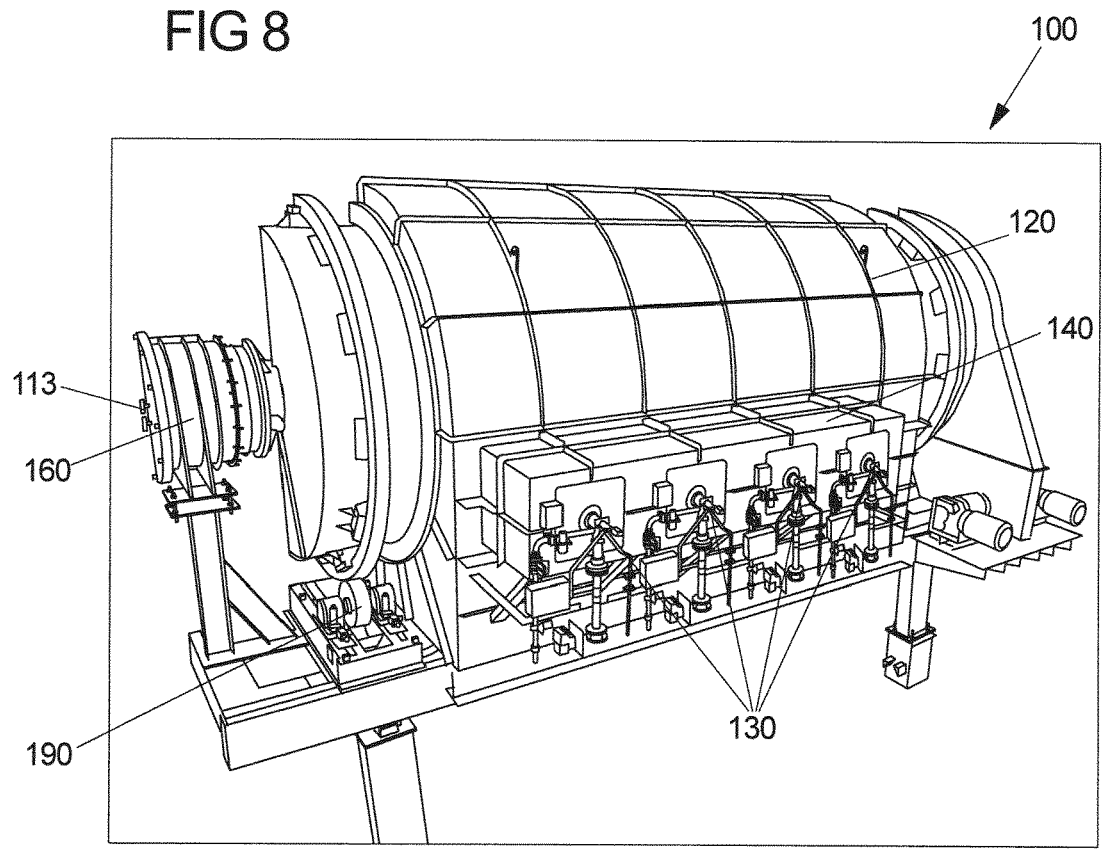
FIG. 8 shows the heating tunnel with burner and pre-combustion chamber.

FIGS. 7 and 8 show the housing 120 of the system 100, which forms the heating chamber 121. Four gas burners 130 are connected via connector pipes to the heating chamber 121. The heating pipes are part of a pre-combustion chamber 121. Further shown in FIG. 8 is the seal 160 of the central lance 113 and a bearing 190 of the rotating reactor 110. The housing further comprises an opening 160 for exhaust gas.

Figure 9:
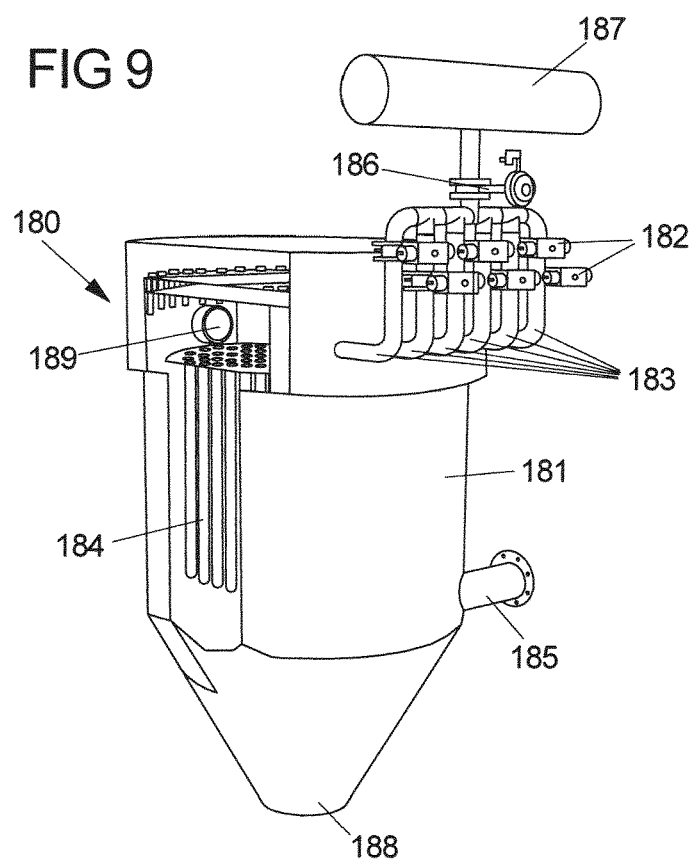
FIG. 9 visualizes the hot gas filter.

FIG. 9 shows the hot gas filter 180 comprising a filter housing 181 and pressure lines 182 for introducing purge gas into the hot gas filter 180 via purge gas inlet 186. The cleaning of the filter cartridges 184 with purge gas, such as nitrogen, is controlled by jet valves 182. The pyrolysis gas is introduced into the hot gas filter via inlet 185. The hot gas filter 180 comprises at the lower end a conical form, which ends with an outlet 188 for the solids that are removed from the pyrolysis gas. The solids fall into the diverter 170 by gravity. The hot gas filter 180 further comprises an outlet 189 for the solids-free pyrolysis gas into direction of the condenser (not shown). For proper operation, the hot gas filter 180 comprises a backflush tank 187.

Figure 10:
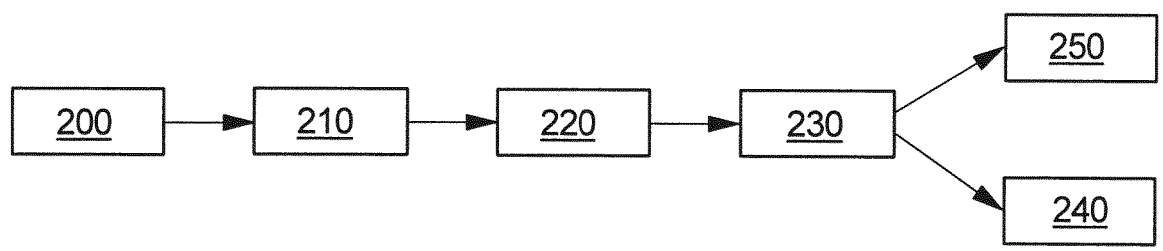
FIG. 10 represents a flowsheet of the process of the invention.

FIG. 10 represents a flowsheet of the process of the invention. The process according to FIG. 10 can be described as follows:

200

The system 100 of the invention is fed with the heavy fuel oil from storage tanks via a pump and a pressure line. In order to ensure a reliable process, a second pump may be kept in reserve. The pressure line to the rotating reactor 110 is electrically heated with an operation temperature in the range of 50 to 80° C., preferably 60 to 70° C., most preferably of 65° C., because a lower temperature results in an increase in viscosity of the heavy fuel oil and thus in increased pressure losses.

The heavy oil must be finely atomized, coated with a protective medium and evenly distributed on the inner wall 114 of the rotating reactor 110. In the rotating reactor 110 the cracking reaction takes place.

210

As described for the system 100 of the invention above, the heavy fuel oil is fed into the rotating reactor 110 via a number of spray lances 150 comprising nozzles 151 in order to achieve a uniform spray pattern but to also to prevent an overlapping spray pattern of the individual nozzles 151. For example, for a rotating reactor 110 of approx. 4 m length and with a diameter of 2.8 m, four nozzles 151 are used to meet the prerequisites of the spray pattern. In order to decouple the nozzles 151 hydraulically from each other and to be able to lock and flush them individually in the event of an operational malfunction, they are fed individually into the reactor 110 via separate spray lances 150 of different length. The input feed is thus divided into four identical partial feeds. The required protective film is achieved by dosing steam in a ratio of approx. 1:10 with controlled quantities. Static mixers are used to achieve a largely homogeneous mixture of oil and steam.

The required operating temperature of 500 to 600° C. at the inner wall 114 of the rotating reactor 110 is achieved by four gas burners 130 with a 250 kW output, operated with natural gas or recycled pyrolysis gas. In a heat exchanger, the combustion air is preheated with the hot flue gases according to the counterflow principle.

Coke adhering to the rotating reactor wall 114 is removed by scraping and conveyed due to the inclined position rotating reactor 110 towards the outlet of the reactor 110 into the diverter. The solid material accumulates at the lower end of the diverter and is discharged continuously by a separating system via a rotary valve. The gas flow is discharged at the upper outlet of the diverter. The diverter as well as the downstream system components between reactor 110 and condenser are electrically heated at a holding temperature of 550° C. The temperature of the diverter is determined by the temperature of the reactor 110. The high temperatures are important to prevent condensation in the system components before the condensation stage in order to prevent sticking and clogging of the system components.

220

Solid particles contained in the gas stream are filtered in the downstream hot gas filter 180.

Rigid filter elements 184 are suspended in an insulated container 181 with a conical dust collection chamber at the lower end, which comprises filter cartridges 184 made of robust ceramic fibers resistant to temperatures up to 850° C. and chemicals. The pyrolysis gas is introduced laterally in the lower part of the filter via inlet 185, where the dust containing gas is deflected in such a way that larger particles are already separated here as a result of gravity forces. The pyrolysis gas, which is still loaded with fine dust, now flows through the filter elements 184 suspended in the filter container from the outside to the inside, whereby the dust is separated on the surface of the filter cartridges 184. The now dust-free pyrolysis gas reaches the gas outlet 189 via the filter head and is still at a temperature level sufficient for the subsequent condensation.

The filter elements 184 located in the hot gas filter 180 are grouped into several filter groups, which can be shut off separately towards the outlet. Differential pressure and/or time-controlled, one chamber at a time is decoupled from the gas cleaning process, while the gas filtration continues to run normally via the filter elements 184 of the remaining chambers. To clean the filter elements, jet valves 182 of the shut-off chamber are opened one after the other for fractions of a second, whereby purge gas ($N_2$/300° C.) flows into the interior of the filter cartridges 184 at high pressure via pressure lines 183. This short rinsing impulse is sufficient to blow off the filter cake. The "offline" cleaning process means that the dust is not immediately drawn back onto the filter elements 184, but falls downwards into a dust collection chamber. Since only small quantities of purge gas are used for pulse cleaning, there is no temperature reduction in the gas and dust collection chamber of the filter 180, which is also sufficiently heat-insulated and electrically heated (500° C.). The dust falls into the diverter 170 and is discharged by the continuous operation of the rotary valve, which is also used for discharging the scraped coke from the lower end of the rotating reactor 110.

230

The dust-free pyrolysis gas is fed to the condensation stage via the shortest possible route at 550° C. process temperature. In the condenser, heavy boiling hydrocarbons, aqueous phase and inert gas fraction are separated. The essential condensation products are gas oil/naphtha and water. These are collected in a storage container and, after a certain dwell time, separated in a level-controlled manner and transported to downstream plants or storage tanks for further use.

The non-condensable residual gas flow is fed into an exhaust system.

240

In the regular operation of the system 100 of the invention the low-boiling hydrocarbons (methane, ethane, propane, butane, pentane) comprised in the produced gas, are fed as fuel to the gas burners 130 to heat the rotating rector 110.

250

The coke produced exits the diverter 170 and the hot gas filter 180 at 550° C. process temperature. With rotary valves, the coke is discharged under largely gas-tight conditions to the downstream equipment. A hot-rolling screw conveyor collects the material flow and conveys it to a cooling screw conveyor. The coke is cooled down to a temperature of 60° C. in the cooling screw. Subsequently it is filled into Big Bags. The Big Bags are inflated with nitrogen prior to filling, which in turn inertises the conveying and cooling screws in counterflow to the coke. The Big Bags are preferably dustproof and conductive.

Advantages of the Invention

The system and process of the invention have several advantages compared to the conventional systems and processes. One main problem associated with cracking of heavy fuel oil is the formation of coke which adheres at the reactor wall at one hand and which is partly distributed in the gaseous reaction products as soft coke and dust. With the system and process of the invention, it is possible for the first time to operate a pyrolysis reactor in a reliable and continuous manner over long time periods, because means and methods are provided to effectively remove the coke from the reactor wall as well as from the gaseous reaction products continuously. The system further solves problems like gas tightness of the rotating reactor by providing special sealings, and the prevention of hot spots in the reactor by indirect heating of the rotating reactor. Moreover, the entire system is temperature controlled to prevent cold points and undesired condensation in the reactor and associated assemblies.

The system of the invention further fulfills today's environmental requirements. Almost any products resulting from the process of the invention are further used or recycled, such as gas oil/naphta for the production of fuel and recycling oils, such as base oil and base oil products. In a heat exchanger, the combustion air is preheated with the hot flue gases according to the counterflow principle. The pyrolysis gas produced with the method of the invention is re-used for producing the required process heat with the gas burners of the system. The scraped coke is further used as fuel for blast furnaces.

List of Reference Numerals

100 System of the invention
110 Rotating reactor
111 Scraper plate
112 Distance element
113 Central lance
114 Cylindrical part of the rotating reactor
115 Funnel
116 Auger plates
120 Outer jacket, housing
121 Heating channel
122 Ribbed plates
130 Gas burner
140 Pre-combustion chamber
150 Spray lance
151 Nozzle
152 Spray cone of a nozzle
153 Debris of scraped coke
160 Seal
170 Diverter
171 Funnel for solids 172 Outlet to rotary valve
173 Outlet for pyrolysis gas to hot gas filter
174 Maintenance opening
180 Hot gas filter
181 Filter housing
182 Jet valves
183 Pressure lines for purge gas
184 Filter cartridges

The invention claimed is:

1. A system for continuous processing of heavy fuel oil from recycling waste oil and processing residues of crude oil, comprising:
- at least one rotating kiln comprising an outer stationary jacket which forms a heating channel and an inner rotating reactor configured to recover a solid coke fraction;
- a plurality of spray lances of different lengths configured to distribute via nozzles heavy fuel oil evenly along a longitudinal direction within the rotating reactor, said nozzles configured to produce a spray cone which ensures a non-overlapping spray pattern and an even distribution of the heavy fuel oil in the rotating reactor;
- at least one hot-gas filter receiving process gas from the rotating reactor and configured to separate a filtered process gas from a soft coke fraction;
- at least one condenser that receives the filtered process gas from the at least one hot-gas filter; and
- a plurality of gas burners arranged along a longitudinal direction of the rotating kiln and sufficient to evenly and indirectly heat the rotating reactor;
- wherein the rotating reactor comprises scrapers, wherein said scrapers are inclined and are configured to continuously remove accumulated solid coke from an inner wall of the rotating reactor and convert said accumulated solid coke into powdery coke,
- the rotating reactor is inclined at an angle between 2° and 8° in order to continuously discharge the powdery coke from the rotating reactor by gravity,
- the system further comprises a funnel comprising auger plates for discharging the powdery coke from the rotating reactor, and
- said system is configured to operate at a process temperature in a range of 500 to 600° C. measured at the inner wall of the rotating reactor.

2. The system of claim 1, wherein said nozzles project the heavy fuel oil evenly into a volume of the rotating reactor and onto the inner wall of the rotating reactor.

3. The system of claim 1, wherein said nozzles are arranged such that the heavy fuel oil is sprayed directly on the inner wall of the rotating reactor.

4. The system of claim 1, wherein the rotating reactor is heated indirectly by the gas burners, which are mounted to the heating channel via a pre-combustion chamber.

5. The system of claim 1, wherein an outer wall of the rotating reactor is equipped with ribbed plates to ensure turbulent flow and even distribution of heating gas within the heating channel.

6. The system of claim 1, wherein said system further comprises a diverter, rotary valves, a hot-rolling screw conveyor and a cooling screw conveyor for discharging the powdery coke from the system.

7. The system of claim 1, wherein said system further comprises a filling station in which the powdery coke is filled into containers.

8. The system of claim 1, wherein said at least one hot-gas filter comprises fiber-ceramic filter cartridges, which are suspended in an insulated container with a conical dust collection chamber, wherein the filter cartridges are resistant to temperatures up to 850° C. and chemicals.

9. The system of claim 8, wherein the at least one hot-gas filter comprises jet valves for cleaning the filter cartridges.

10. The system of claim 1, wherein said scrapers are configured to maintain a thickness of the solid coke layer at the inner wall of the rotating reactor below 1.0 mm.

11. A process for continuous processing of heavy fuel oil from the recycling of waste oil and processing residues of crude oil comprising the steps of:
- thermal cracking of heavy fuel oil in a system according to claim 1;
- discharging the process gas from the rotating reactor via a diverter to the at least one hot-gas filter for separation of soft coke particles and thereafter from the at least one hot-gas filter to the condenser;
- discharging the scraped powdery coke from the rotating reactor; and
- partially condensing the process gas in the condenser and draining a resulting naphtha/gasoil mixture into storage tanks for further processing.

12. The process of claim 11, wherein the process temperature in the rotating reactor is controlled between 500 and 600° C., measured at the inner wall of the rotating reactor.

13. The process of claim 11, wherein flue gases are produced in said process and said flue gases are used to preheat combustion air for the gas burners according to a counterflow principle.

14. The process of claim 13, wherein low-boiling hydrocarbons comprised in the flue gas are fed as fuel to the gas burners to heat the rotating rector.

15. The process of claim 14, wherein the low-boiling hydrocarbons are one or more selected from the group consisting of methane, ethane, propane, butane, and pentane.

* * * * *